United States Patent
Young et al.

(10) Patent No.: US 7,808,772 B2
(45) Date of Patent: Oct. 5, 2010

(54) ELECTRICAL INSULATION SYSTEM AND METHOD FOR ELECTRICAL POWER STORAGE COMPONENT SEPARATION

(75) Inventors: Charlie Young, Hillsboro, OR (US); Ted Guzman, Gresham, OR (US)

(73) Assignee: Micro Power Electronics, Inc., Beaverton, OR (US)

( * ) Notice: Subject to any disclaimer, the term of this patent is extended or adjusted under 35 U.S.C. 154(b) by 0 days.

(21) Appl. No.: 12/554,806

(22) Filed: Sep. 4, 2009

(65) Prior Publication Data

US 2010/0058575 A1     Mar. 11, 2010

Related U.S. Application Data

(62) Division of application No. 11/420,708, filed on May 26, 2006, now Pat. No. 7,586,736.

(60) Provisional application No. 60/698,294, filed on Jul. 11, 2005.

(51) Int. Cl.
    *H01G 9/00* (2006.01)
(52) U.S. Cl. .............. 361/502; 361/503; 361/504; 361/509; 361/512; 361/516
(58) Field of Classification Search .............. 361/502, 361/503–504, 509–512, 516–519; 429/53–54, 429/94, 99, 100
    See application file for complete search history.

(56) References Cited

U.S. PATENT DOCUMENTS

| | | | |
|---|---|---|---|
| 5,384,212 A | 1/1995 | Heiman et al. | |
| 5,395,263 A | 3/1995 | Sandell | |
| 5,631,098 A | 5/1997 | Suzuki et al. | |
| 5,756,229 A | 5/1998 | Pyszczek et al. | |
| 5,853,912 A * | 12/1998 | Naing et al. | 429/61 |
| 5,977,746 A | 11/1999 | Hershberger et al. | |
| 6,007,944 A * | 12/1999 | Bechtold et al. | 429/211 |
| 6,045,949 A | 4/2000 | Kuipers et al. | |
| 6,063,518 A | 5/2000 | Dewulf et al. | |
| 6,110,618 A | 8/2000 | Vacheron et al. | |
| 6,119,864 A | 9/2000 | Kessler et al. | |
| 6,146,783 A | 11/2000 | Brohm et al. | |
| 6,190,794 B1 | 2/2001 | Wyser | |
| 6,275,372 B1 * | 8/2001 | Vassallo et al. | 361/511 |
| 6,399,238 B1 * | 6/2002 | Oweis et al. | 429/99 |
| 6,558,835 B1 | 5/2003 | Kurisu et al. | |
| 6,631,072 B1 * | 10/2003 | Paul et al. | 361/502 |
| 6,697,249 B2 * | 2/2004 | Maletin et al. | 361/502 |
| 6,741,448 B2 * | 5/2004 | Mido et al. | 361/302 |
| 6,899,975 B2 | 5/2005 | Watanabe et al. | |
| 6,913,852 B2 | 7/2005 | Nakanishi et al. | |

(Continued)

FOREIGN PATENT DOCUMENTS

DE     10134145     2/2003

(Continued)

*Primary Examiner*—Nguyen T Ha
(74) *Attorney, Agent, or Firm*—Perkins Coie LLP

(57) ABSTRACT

An electrical insulation system and method for electrical power storage component separation is disclosed. Some implementations of the system use various forms of polyurethane elastomer based material such as tapes to electrically separate various components of electrical power storage devices such as battery packs. These components can include cells, connecting tabs, printed circuit assemblies, solder joints, nickel strips, and other conductive members.

20 Claims, 5 Drawing Sheets

U.S. PATENT DOCUMENTS

| | | |
|---|---|---|
| 7,160,644 B2 | 1/2007 | White et al. |
| 7,554,790 B2 * | 6/2009 | James et al. ................ 361/502 |
| 2005/0077873 A1 | 4/2005 | Watson et al. |
| 2006/0091852 A1 | 5/2006 | Watson et al. |
| 2009/0061301 A1 | 3/2009 | Planck |

FOREIGN PATENT DOCUMENTS

| | | |
|---|---|---|
| EP | 1635416 | 3/2006 |
| WO | WO-2005038954 | 4/2005 |

* cited by examiner

US 7,808,772 B2

ELECTRICAL INSULATION SYSTEM AND METHOD FOR ELECTRICAL POWER STORAGE COMPONENT SEPARATION

CROSS-REFERENCE TO RELATED APPLICATIONS

This application is a divisional of U.S. patent application Ser. No. 11/420,708, filed May 26, 2006, now U.S. Pat. No. 7,586,736 titled "ELECTRICAL INSULATION SYSTEM AND METHOD FOR ELECTRICAL POWER STORAGE COMPONENT SEPARATION," which claims priority benefit of provisional application Ser. No. 60/698,294, filed Jul. 11, 2005.

BACKGROUND OF THE INVENTION

1. Field of the Invention

The present invention is generally related to electrical storage devices.

2. Description of the Related Art

Battery packs can contain various electrically related components that require electrical separation from one another by using electrical insulation in order to avoid malfunctions and electrical hazards such as caused by unwanted short circuits. Unfortunately, conventional electrical insulation materials used for this electrical separation, such as kapton, nomex, or fishpaper insulators, can be damaged relatively easily through normal use in contacting these components. The components can contain various surfaces, some of which can have relatively sharp areas that may puncture, cut or otherwise breach or penetrate the electrical insulating materials to void the desired electrical separation required of the electrical insulating materials. As a consequence, hazardous conditions can result.

BRIEF DESCRIPTION OF THE SEVERAL VIEWS OF THE DRAWING(S)

DETAILED DESCRIPTION OF THE INVENTION

An electrical insulation system and method for electrical power storage component separation is disclosed herein. Some implementations of the system use various forms of polyurethane elastomer based material or other such materials to electrically separate various components of electrical power storage devices such as battery packs. The polyurethane elastomer material and other such materials have sufficient durability to maintain electrical separation between the various components over a typical life of system operation despite forces that can be applied to the material by components and other surfaces of the system during such life. These components can include cells, connecting tabs, printed circuit assemblies, solder joints, nickel strips, wires, and other conductive members. The components can have sharp edges, abrasive surfaces, protruding members, or other unsmooth areas configured to penetrate conventional insulating materials when a force typical to a life of the electrical storage system is applied unto the conventional insulating material by an unsmooth area of a component or other structure of the electrical storage system. Indicators for durability of a material to withstand forces applied to the material by unsmooth areas during system life include, but are not limited to, tensile strength at break of the material and elongation length at break of the material.

Material properties of the polyurethane elastomer based materials, such as polyurethane tapes, may be used to increase reliability of electrical separation found in the electrical power storage devices utilizing the system. For instance, unlike conventional insulating materials, the polyurethane elastomer based materials can be more resistant to puncture and other penetration by various components to maintain electrical separation between components.

Resistance to puncture and other penetration can help contribute to reliability of electrical storage devices such as within electrical storage packs using internal insulation to electrically separate battery cells from nickel strips, solder wires, printed circuit assemblies and other conductive components that can pose puncture problems for conventional insulation materials. Consequently, the potential for electrical hazards, such as internal electrical shorts, to occur between portions of electrical storage devices may be reduced and the reliability of the electrical power storage devices may be improved.

Figure 1:
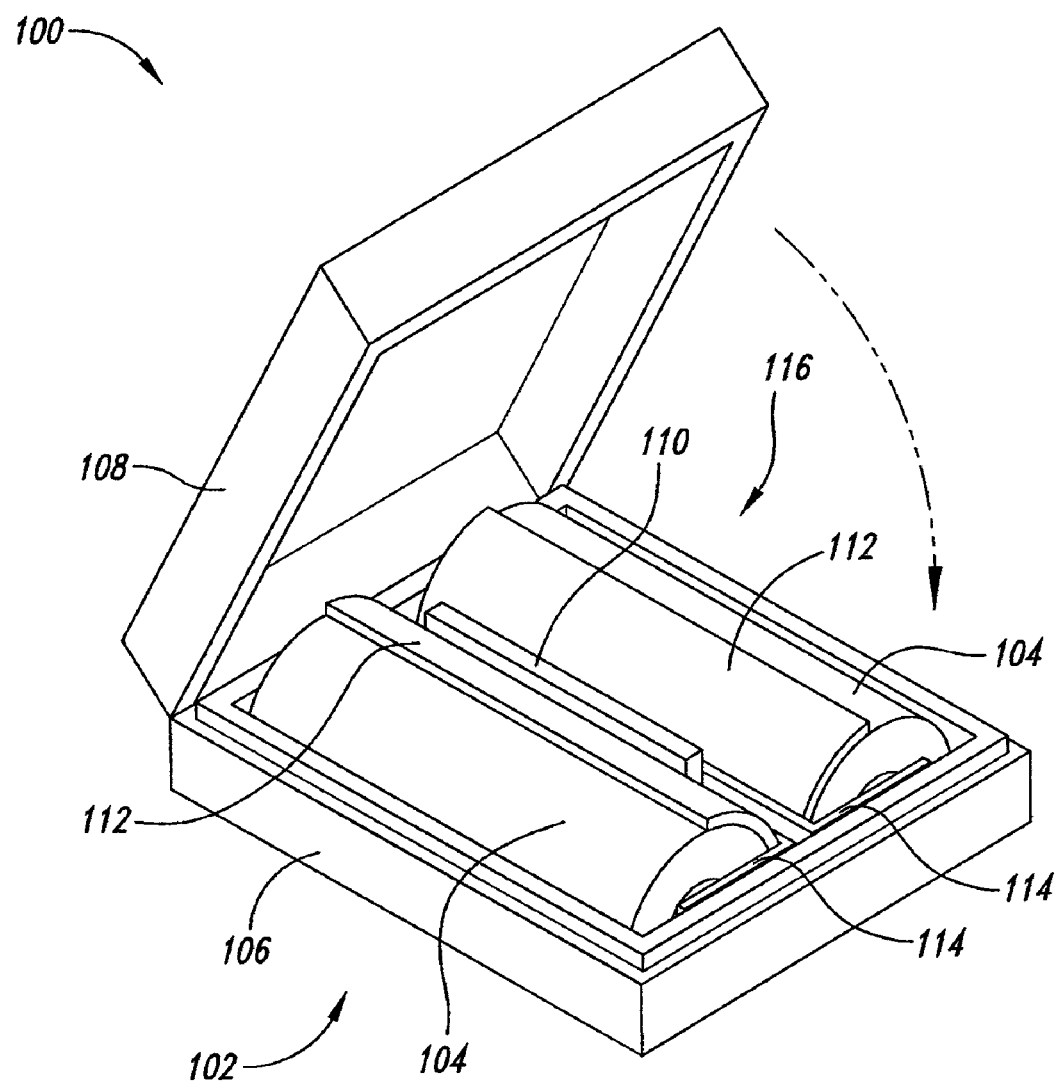
FIG. 1 is an isometric view of a battery pack containing an electrical insulation system.
Figure 2:
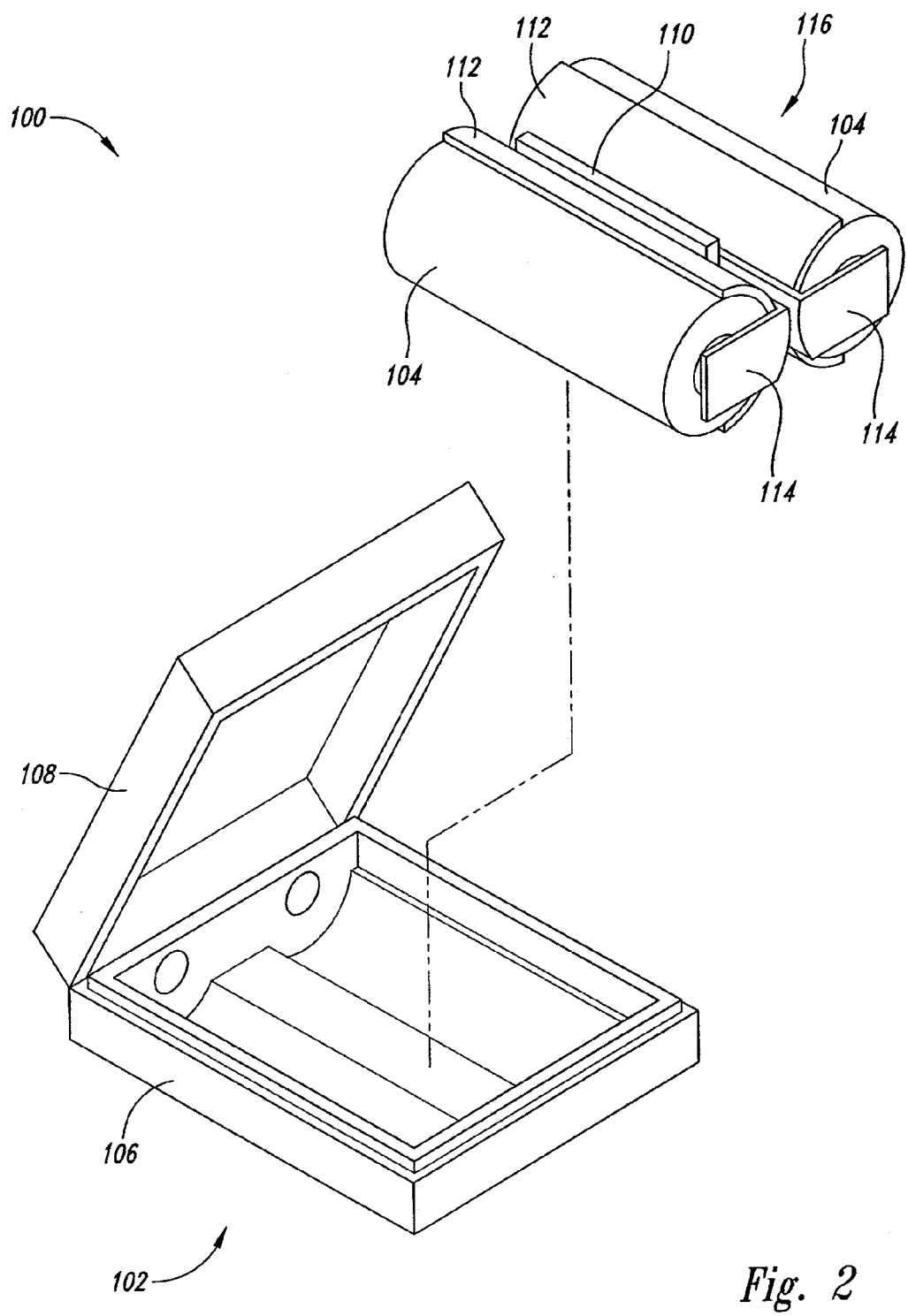
FIG. 2 is a partially exploded isometric view of the battery pack of FIG. 1.

An exemplary battery pack 100 incorporating an electrical insulating system 102 is shown in FIG. 1. The battery pack 100 has two battery cells 104, a case 106, a case cover 108 and a printed circuit assembly 110 with first conductive portions 110a and second conductive portions 110b (shown in FIG. 3). The insulating system 102 includes cell covers 112 and conductor covers 114. Each of the cell covers 112 is shaped to cover a longitudinal portion of one of the battery cells 104.

Figure 3:
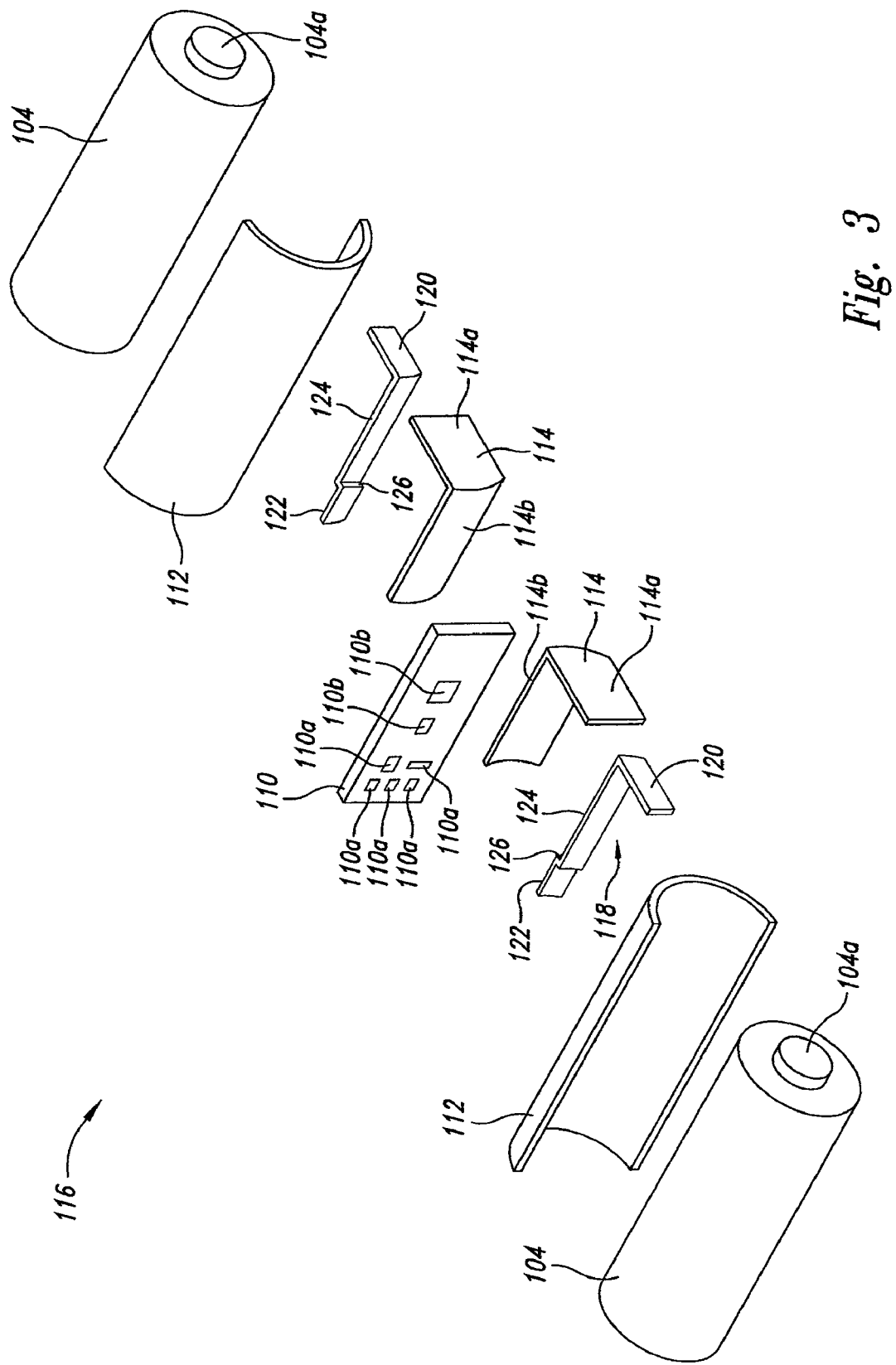
FIG. 3 is an exploded isometric view of a battery subassembly of the battery pack of FIG. 1.
Figure 4:
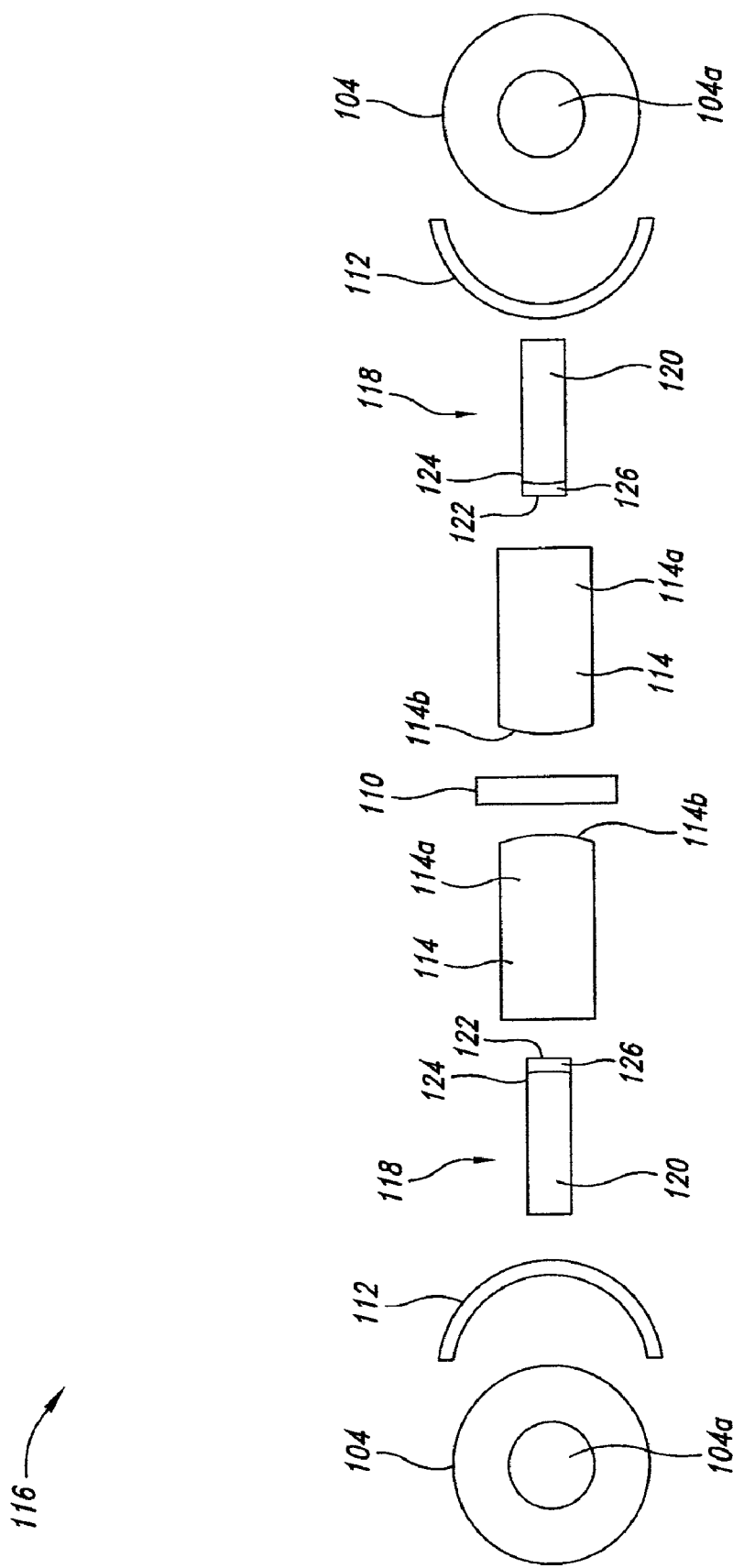
FIG. 4 is an exploded side elevational view of the battery subassembly of in FIG. 3.
Figure 5:
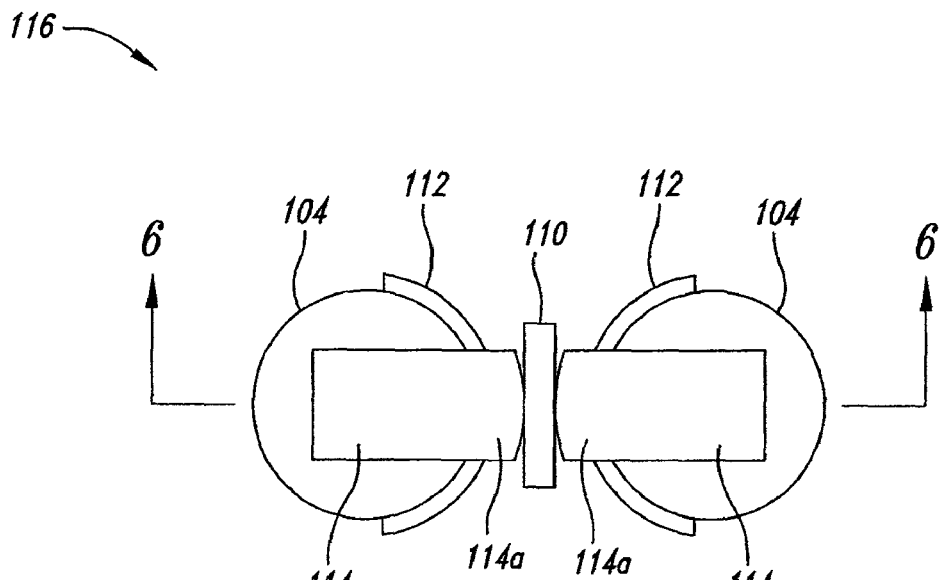
FIG. 5 is a side elevational view of the battery subassembly of FIG. 3.
Figure 6:
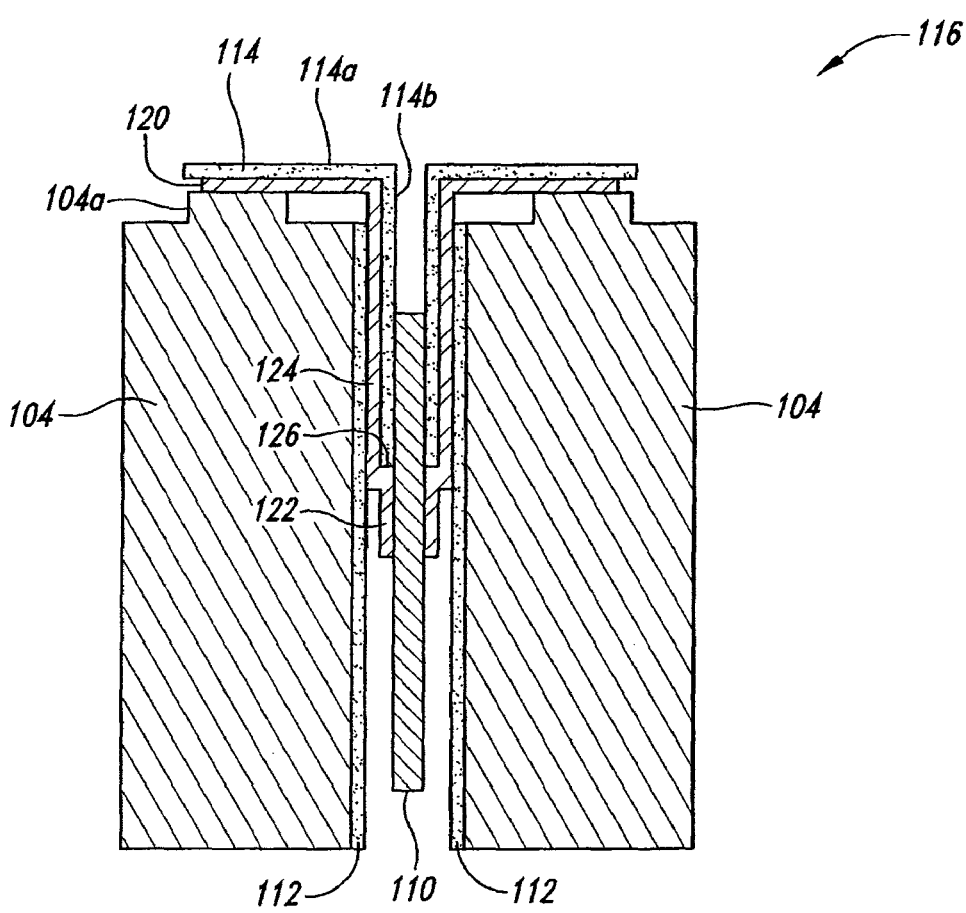
FIG. 6 is a cross-sectional view of the battery subassembly taken substantially along line 6-6 of FIG. 5.

A battery pack sub-assembly 116, shown in FIGS. 2-6, includes the insulating system 102, the two battery cells 104, and electrical conducting strips 118. The conductor covers 114 of the insulating system 102 each have a first portion 114a and a second portion 114b at approximately ninety-degrees with each other as shown in FIG. 3. The electrical conducting strips 118 are each shaped to contact a positive terminal 104a of one of the battery cells 104 with a first end portion 120 of the strip and also to contact the first conductive portions 110a of the printed circuit assembly 110 with a second end portion 122 of the strip.

A mid-portion 124 of the conductive strip 118 has a contoured portion 126 with two approximate ninety-degree bends to accommodate placement of the second portion 114b of the conductor cover 114 between the mid-portion of the conductive strip and the second conductive portions 110b of the printed circuit assembly 110. The contoured portion 126 of the conductive strip 118 allows for the second end portion 122 of the conductive strip 118 to contact the first conductive portions 110a of the printed circuit assembly 110 while the second portion 114b of the conductor cover 114 is in juxtaposition with the second conductive portions 110b of the printed circuit assembly.

The cell covers 112 and the conductor covers 114 are made from polyurethane elastomer based tapes to resist potential puncture. In some implementations the polyurethane elastomer based tapes utilize Minnesota Mining and Manufacturing Polyurethane Protective Tape 8562 indoor grade having a typical tensile strength at break per ASTM D882 of approximately 40 pounds per inch and elongation strength at break typically of approximately 400%.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for manufacturing an electrical storage device having a life, the method comprising:
   providing a first storage device component with a first electrically conducting surface portion;
   providing a second storage device component with a second electrically conducting surface portion, at least one of the first electrically conducting surface portion and the second electrically conducting surface portion having an unsmooth area;
   providing puncture resistant electrical insulating material having a durability;
   positioning the first storage device component, the second storage device component, and the insulating material inside the electrical storage device with the insulating material adjacent at least the unsmooth area, the durability of the insulating material being sufficient to resist forces imparted to the insulating material by the unsmooth area to maintain electrical separation between the first electrically conducting surface portion and the second electrically conducting surface portion over the life of the electrical storage device.

2. The method of claim 1 wherein the insulating material is tape.

3. The method of claim 1 wherein the insulating material contains polyurethane.

4. The method of claim 1 wherein the insulating material is a polyurethane elastomer.

5. The method of claim 1 wherein the insulating material has a tensile strength at break of at least approximately 40 pounds per square inch.

6. The method of claim 1 wherein the insulating material has an elongation length at break of at least approximately 400% of an unstressed sample.

7. A method for manufacturing a battery pack having a life, the method comprising:
   positioning a battery cell proximate to a circuit, the battery cell including a first portion and a first terminal, the circuit including a conductive first portion and a second portion;
   positioning an electrically conductive member proximate to the battery cell and the circuit, the electrically conductive member including a first portion, a second portion, and a third portion, such that the first portion of the electrically conductive member contacts the first terminal of the battery cell and the second portion of the electrically conductive member contacts the conductive first portion of the circuit;
   positioning first electrical insulating material between the first portion of the battery cell and the third portion of the electrically conductive member, at least one of the first portion of the battery cell and the third portion of the electrically conductive member including a first unsmooth area, the first electrical insulating material having sufficient durability to maintain electrical separation between the first portion of the battery cell and the third portion of the electrically conductive member over the life of the battery pack; and
   positioning second electrical insulating material between the second portion of the circuit and the third portion of the electrically conductive member, at least one of the second portion of the circuit and the third portion of the electrically conductive member having a second unsmooth area, the second electrical insulating material having sufficient durability to maintain electrical separation between the second portion of the circuit and the third portion of the electrically conductive member over the life of the battery pack.

8. The method of claim 7 wherein the battery cell is a first battery cell, the electrically conductive member is a first electrically conductive member, the circuit further includes a conductive third portion and a fourth portion, and wherein the method further comprises:
   positioning a second battery cell proximate to the circuit, the second battery cell including a first portion and a first terminal;
   positioning a second electrically conductive member proximate to the second battery cell and the circuit, the second electrically conductive member including a first portion, a second portion, and a third portion, such that the first portion of the second electrically conductive member contacts the first terminal of the second battery cell and the second portion of the second electrically conductive member contacts the conductive third portion of the circuit;
   positioning third electrical insulating material between the first portion of the second battery cell and the third portion of the second electrically conductive member, at least one of the first portion of the second battery cell and the third portion of the second electrically conductive member including a third unsmooth area, the third electrical insulating material having sufficient durability to maintain electrical separation between the first portion of the second electrical battery cell and the third portion of the second electrically conductive member over the life of the battery pack; and
   positioning fourth electrical insulating material between the fourth portion of the circuit and the third portion of the second electrically conductive member, at least one of the fourth portion of the circuit and the third portion of the second electrically conductive member having a fourth unsmooth area, the fourth electrical insulating material having sufficient durability to maintain electrical separation between the fourth portion of the circuit and the third portion of the second electrically conductive member over the life of the battery pack.

9. The method of claim 7 wherein positioning an electrically conductive member includes positioning an electrically conductive member that includes at least one bend that accommodates the conductive first portion of the circuit contacting the second portion of the electrically conductive member.

10. The method of claim 7 wherein the third portion of the electrically conductive member includes multiple bends to accommodate positioning the second electrical insulating material between the second portion of the circuit and the second portion of the electrically conductive member.

11. The method of claim 7 wherein the first portion of the battery cell is a first generally curvilinear exterior surface portion, and wherein positioning first electrical insulating material includes positioning first electrical insulating material that includes a second generally curvilinear exterior surface portion proximate to the first generally curvilinear exterior surface portion.

12. The method of claim 7 wherein positioning second electrical insulating material includes positioning second electrical insulating material that includes a first portion and a second portion generally perpendicular to the first portion.

13. The method of claim 7, further comprising positioning the battery cell, the circuit, the electrically conductive member, the first electrical insulating material and the second electrical insulating material in an interior portion of a housing.

14. The method of claim 7 wherein the first unsmooth area includes at least one of a first abrasive surface, a first sharp edge, and a first protruding member, and wherein the second unsmooth area includes at least one of a second abrasive surface, a second sharp edge, and a second protruding member.

15. The method of claim 7 wherein at least one of the first electrical insulating material and the second electrical insulating material includes polymeric material.

16. The method of claim 7 wherein at least one of the first electrical insulating material and the second electrical insulating material includes tape.

17. A method for manufacturing a battery pack having a life, the method comprising:
   forming at least a portion of the battery pack, by—
      positioning a first battery pack component proximate to a second battery pack component, the first battery pack component including a first surface portion and the second battery pack component including a second surface portion, at least one of the first battery pack component and the second battery pack component including an unsmooth area; and
      positioning puncture resistant insulating material proximate to the unsmooth area, the puncture resistant insulating material having a durability sufficient to resist forces imparted to the puncture resistant insulating material by the unsmooth area to maintain separation between the first surface portion of the first battery pack component and the second surface portion of the second battery pack component over the life of the battery pack.

18. The method of claim 17 wherein the unsmooth area is a first unsmooth area, the puncture resistant insulating material having a durability is first puncture resistant insulating material having a first durability, and wherein forming at least a portion of the battery pack further includes—
   positioning a third battery pack component proximate to at least one of the first and second battery pack components, the third battery pack component including a third surface portion, at least one of the second battery pack component and the third battery pack component including a second unsmooth area; and
   positioning second puncture resistant insulating material having a second durability proximate to the second unsmooth area, the second durability of the second puncture resistant insulating material being sufficient to resist forces imparted to the second puncture resistant insulating material by the second unsmooth area to maintain separation between the third surface portion of the third battery pack component and the second surface portion of the second battery pack component over the life of the battery pack.

19. The method of claim 17 wherein the first surface portion of the first battery pack component is generally curvilinear, and wherein positioning puncture resistant insulating material includes positioning puncture resistant insulating material having a generally curvilinear surface portion proximate to the generally curvilinear first surface portion.

20. The method of claim 17 wherein the first surface portion of the first battery pack component is a first electrically conducting surface portion, the second surface portion of the second battery pack component is a second electrically conducting surface portion, and wherein positioning puncture resistant insulating material includes positioning puncture resistant electrical insulating material having a durability proximate to the unsmooth area, the durability of the puncture resistant electrical insulating material being sufficient to resist forces imparted to the puncture resistant electrical insulating material by the unsmooth area to maintain electrical separation between the first electrically conducting surface portion and the second electrically conducting surface portion over the life of the battery pack.

\* \* \* \* \*